United States Patent [19]

Bereiter et al.

[11] Patent Number: 4,818,163
[45] Date of Patent: Apr. 4, 1989

[54] ANCHOR BOLT ASSEMBLY INCLUDING A BOLT AND AN EXPANDING SLEEVE

[75] Inventors: Rolf Bereiter, Grabs, Switzerland; Peter von Flue, Ruggell, Liechtenstein

[73] Assignee: Hilti Aktiengesellschaft, Fürstentum, Liechtenstein

[21] Appl. No.: 169,087

[22] Filed: Mar. 17, 1988

Related U.S. Application Data

[63] Continuation of Ser. No. 935,068, Nov. 21, 1986, abandoned, which is a continuation of Ser. No. 705,412, Feb. 26, 1985, abandoned, which is a continuation of Ser. No. 436,175, Oct. 22, 1982, abandoned.

[30] Foreign Application Priority Data

Nov. 20, 1981 [DE] Fed. Rep. of Germany ....... 3146027

[51] Int. Cl.⁴ .............................................. F16B 13/06
[52] U.S. Cl. ....................................... 411/44; 411/54; 411/57; 411/70
[58] Field of Search .................. 411/55, 57, 60, 44, 411/31, 32, 70, 30, 72, 29, 54

[56] References Cited

U.S. PATENT DOCUMENTS

| | | | |
|---|---|---|---|
| 1,244,992 | 10/1917 | Lee | 411/31 |
| 1,755,489 | 4/1930 | Phillips | 411/31 |
| 1,772,063 | 8/1930 | Zifferer | 411/55 |
| 2,171,985 | 9/1939 | Mushet | 411/31 |
| 2,313,522 | 3/1943 | Dinnes | 411/44 |
| 2,963,935 | 12/1960 | Shields | 411/31 |
| 3,107,570 | 10/1963 | Zifferer et al. | 411/60 X |
| 3,139,730 | 7/1964 | Williams et al. | 411/60 X |
| 4,050,345 | 9/1977 | Reibetanz et al. | 411/31 |

FOREIGN PATENT DOCUMENTS

| | | | |
|---|---|---|---|
| 208769 | 12/1955 | Australia | 411/55 |
| 59825 | 9/1982 | European Pat. Off. | 411/44 |
| 56798 | 6/1891 | Fed. Rep. of Germany | 411/55 |
| 2103132 | 8/1972 | Fed. Rep. of Germany | 411/31 |
| 1949196 | 3/1974 | Fed. Rep. of Germany . | |
| 2744666 | 10/1977 | Fed. Rep. of Germany | 411/55 |
| 139444 | 1/1980 | Fed. Rep. of Germany | 411/57 |
| 510113 | 8/1920 | France | 411/55 |
| 1261615 | 4/1961 | France | 411/55 |
| 1297330 | 5/1962 | France | 411/55 |
| 1379461 | 1/1964 | France | 411/44 |
| 1400747 | 4/1965 | France | 411/55 |
| 536627 | 12/1955 | Italy | 411/55 |
| 30915 | 6/1904 | Switzerland | 411/50 |
| 241600 | 9/1946 | Switzerland | 411/60 |
| 7977 | of 1900 | United Kingdom | 411/55 |
| 7775 | of 1904 | United Kingdom | 411/55 |
| 444623 | 3/1936 | United Kingdom | 411/55 |
| 1048548 | 11/1966 | United Kingdom | 411/72 |
| 1071556 | 6/1967 | United Kingdom | 411/44 |

Primary Examiner—Gary L. Smith
Assistant Examiner—Rodney M. Lindsey
Attorney, Agent, or Firm—Toren, McGeady & Associates

[57] ABSTRACT

An anchor bolt assembly includes an axially elongated bolt and an axially elongated expanding sleeve laterally encircling the bolt. The sleeve is axially slotted from its leading end. The bolt includes an axially elongated cylindrically shaped shank with a frusto-conical section at its leading end and means for attaching a load to the bolt at its trailing end. A stop extends axially outwardly from the leading end of the frusto-conical section. In the axially extending region of the slots, the outer surface of the sleeve has an axially extending reduced diameter section.

2 Claims, 1 Drawing Sheet

ANCHOR BOLT ASSEMBLY INCLUDING A BOLT AND AN EXPANDING SLEEVE

This is a continuation of application Ser. No. 935,068, filed Nov. 21, 1986, now abandoned, which is a continuation of Ser. No. 705,412, filed Feb. 26, 1985, now abandoned, which is in turn a continuation of Ser. No. 436,175, filed Oct. 22, 1982, now abandoned.

SUMMARY OF THE INVENTION

The present invention is directed to an anchor bolt assembly including a bolt with an axially elongated cylindrically shaped shank with an enlarged frusto-conical section at its leading end and with engagement means at its trailing end for securing a load to the bolt. An expansion sleeve laterally encircles the bolt and is displaceable relative to it. The sleeve has slots extending axially from its leading end. The inside diameter of the expanding sleeve corresponds to the outside diameter of the shank while the outside diameter of the sleeve is greater than the largest diameter of the frusto-conical section.

Anchor bolt assemblies of the type mentioned above have experienced wide spread use to a large extent based on their economical production because of the simple design involved. As a rule, the design consists of a bolt having a cylindrically shaped shank with a thread or stop at its trailing end, such as a head provided for securing a load on to the bolt. At its leading end the shank has a frusto-conical section diverging outwardly to the leading end of the bolt. The frusto-conical section serves to spread an expanding sleeve for anchoring the sleeve when it is driven over the frusto-conical section or when the frusto-conical section is drawn into the sleeve. The expanding sleeve is arranged on the shank so that it is axially displaceable thereon before the final anchoring of the anchor bolt assembly.

Accordingly, the anchor bolt assembly is secured in a receiving material, such as stone, concrete or the like, when the anchor bolt and the expanding sleeve are inserted as a unit into a prepared borehole and the spreading sleeve is axially displaced relative to the shank. Initially, this displacement is effected by driving the spreading sleeve into the borehole in the leading end direction of the bolt. Subsequently, the bolt is pulled axially out of the borehole relative to the sleeve such as by the load attached to the bolt. Accordingly, the anchoring value attained is dependent, to a great extent, on the degree of widening of the expanding sleeve.

As has been noted in practice, it is practically exclusively the forces of the frictional engagement between the receiving material and the spreading sleeve that are taken into account when there is only a slight widening of the expanding sleeve for effecting the anchorage of the assembly. If the frusto-conical section on the leading end of the bolt provides for an increased widening of the sleeve during the relative displacement of the sleeve, that is, when it is driven into the borehole in the leading end direction, an increased widening of the borehole occurs at its inner end by displacing the material encircling the borehole. The expanding sleeve supported by the frusto-conical section affords a form-locking engagement in the receiving material. When the bolt is subsequently stressed an additional form-locking engagement is added to the frictional engagement and substantially increases the anchoring value of the assembly.

As has been indicated above, the quality of the form-locking engagement of the expanding sleeve within the borehole is of substantial importance for increasing the anchoring values. The form-locking engagement is adequate only when the expanding sleeve effects a sufficient widening of the borehole during the placement of the anchor bolt assembly. Known anchor bolts present considerable problems, since the expanding sleeve becomes jammed in the surface of the borehole when the expanding sleeve is driven into the borehole because of the widening afforded by the frusto-conical enlargement on the anchor bolt. This jamming effect is increased as the expanding sleeve continues to be driven in so that eventually a complete block is effected before the sleeve has reached the required end position. As a result, there is an insufficient widening of the borehole and an insufficient form-locking engagement so that the anchoring value of such an anchor bolt is limited to a considerable degree.

Therefore, it is the primary object of the present invention to provide an anchor bolt assembly of the type where the form-locking engagement can be fully utilized to attain higher anchoring values.

In accordance with the present invention, the expanding sleeve has a reduced diameter portion on its outside surface extending in the axially extending region of the slots provided in the sleeve.

Due to the reduced diameter portion or recess in the outside surface of the expanding sleeve, the anchor bolt is secured within the borehole without any interference. When the anchor bolt assembly is placed in the borehole, that is, when the expanding sleeve is driven in the direction of the leading end of the anchor bolt, that is, toward the frusto-conical section at the leading end, there is a slight play between the surface of the borehole in the receiving material and the outer surface of the expanding sleeve. The amount of play corresponds approximately to the depth of the reduced diameter section of the expanding sleeve. Because of the play present between the surface of the borehole and the expanding sleeve, the sleeve cannot become jammed when it is being driven into the borehole. Accordingly, a sufficient widening of the borehole is achieved. Subsequently, when the anchor bolt is stressed, the play is at least to a large extent eliminated so that the entire outer surface of the expanding sleeve is available for supporting contact with the surface of the borehole.

To assure that the expanding sleeve can be driven in without any interference, the end of the reduced diameter portion on the outside surface of the sleeve is located preferably in the leading end region of the axially extending slots in the sleeve. As a result, the expanding sleeve does not become jammed and prevented from being driven in and it can be widened along its entire axial extent. To provide sufficient play between the surface of the borehole and the outer surface of the expanding sleeve and in the event the anchor bolt is stressed, to avoid any negative influence on the anchoring values because of the play required for the driving in operation, the leading end of the reduced diameter portion is spaced axially from the leading end of the sleeve by a distance approximately equal to the wall thickness of the sleeve.

With such an arrangement, a ring shoulder, having a length corresponding approximately to the wall thickness of the sleeve, and for the full diameter of the sleeve, is provided on the leading end of the expanding sleeve. During the placement of the anchor bolt assembly, the ring shoulder effects the removal of material from the wall or surface of the borehole so that the borehole is widened for effecting the form-locking engagement. With regard to the placement and the anchoring values of the anchor bolt assembly, preferably the depth of the reduced diameter portion is in the range of 0.01 to 0.02 times the maximum outside diameter of the expanding sleeve. By this selection of the relative dimensions of the sleeve, it is possible to ensure that no undue slippage occurs because of the lack of the above-mentioned play.

It is of considerable significance in attaining the required high anchoring values in the anchor bolt assembly according to the present invention that the expanding sleeve can be completely driven into the borehole. In addition to jamming the sleeve in the surface of the borehole as discussed above, when the sleeve is driven in it will be blocked by material displaced from the borehole surface which can form a solid block preventing further movement of the sleeve. Accordingly, another object of the present invention is to provide a solution for preventing such a blockage with its disadvantageous effects.

In accordance with the present invention, this object is achieved by providing an axially extending stop projecting forwardly from the leading end of the anchor bolt with the stop having a cross-section considerably smaller than the cross-sectional area of the shank of the bolt.

With the stop at the leading end of the anchor bolt when it is inserted into the base of the borehole, a space remains between the stop and the lateral surface of the borehole. The axial dimension of the space corresponds substantially to the axial length of the stop. Material displaced from the borehole surface by the expanding sleeve can fall into and remain in this space as the anchor bolt assembly is being secured in position. With the displaced material located in the space it cannot form an obstruction to the placement of the assembly. Since the maximum outside diameter of the expanding sleeve is greater than the maximum diameter of the frusto-conical section on the leading end of the anchor bolt, a passage is provided through which the displaced material can enter the space encircling the stop during the initial phase of driving in the expanding sleeve. This passage, having an annular shape, represents approximately 5 to 15% of the entire transverse cross-section of the borehole. On one hand to provide sufficient support for the anchor bolt at the base of the borehole and, at the same time, to keep the space for the displaced material sufficiently large, the stop is preferably formed as a peg having a diameter in the range of 0.5 to 1 times the diameter of the shank of the bolt. In place of a peg-shaped stop, it can also be formed as a cone, hemisphere, cube or the like.

It is also advantageous if the axial length of the stop is matched to the size of the anchor bolt so that it is in the range of 0.3 to 1 times the diameter of the bolt shank.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
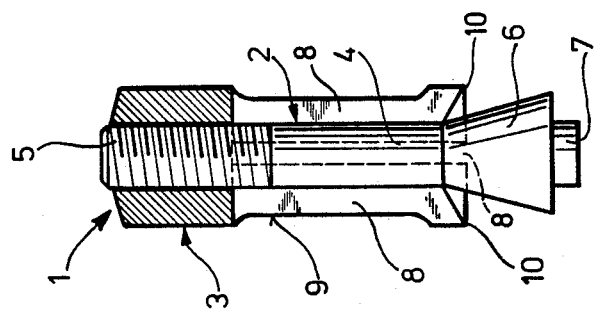
FIG. 1 is an elevational view, partly in section, of an anchor bolt assembly embodying the present invention.

As is shown particularly by FIG. 1, the anchor bolt assembly 1 includes an axially extending anchor bolt 2 and an expanding sleeve 3. Both the anchor bolt 2 and the expanding sleeve 3 have a leading end and a trailing end and as viewed in FIG. 1 the leading end of each is its lower end and the trailing end of each is its upper end. The anchor bolt 2 has a shank 4 extending from its trailing end toward the leading end with a thread 5 formed in the cylindrical surface of the shank and extending from its trailing end for a part of its axial length. At the leading end of the shank 4, that is the opposite end from the thread 5, a frusto-conical section is provided diverging outwardly from the cylindrical surface of the shank to the leading end of the anchor bolt. The leading end of the frusto-conical section 6 has a peg 7 projecting axially outwardly from it. As viewed in FIG. 1, the expanding sleeve 3 laterally surrounds the anchor bolt 2 for approximately the length of the shank 4. Sleeve 3 has axially extending slots 8 open at the leading end of the sleeve and extending toward but spaced from the trailing end. While two axially extending slots 8 are shown in FIG. 1, this number of slots is not a strict requirement and can be varied in accordance with the use to which the anchor bolt assembly is to be employed, the receiving material, the expanding sleeve material or the like. In a portion of the axially extending region of the slots 8, the expanding sleeve 3 has a reduced diameter portion 9 as compared to the outside diameter of the sleeve at its leading and trailing ends. As can be seen best in FIG. 1, the leading end face of the expanding sleeve 3 is chamfered or recessed interiorly of the outside surface of the sleeve so that edges 10 are formed. In effect the edges 10 form a continuous circumferentially extending radially outer edge interrupted only by the leading ends of the slots. The radially outer edge is located in a plane extending perpendicularly of the axis of the sleeve. It has been found in practice that shaping or chamfering the leading end face of the sleeve provides sharp edges 10. The angle of these edges can be selected based on the use to which the anchor bolt assembly is placed, for example, the leading end face can be provided in a plane normal to the axis of the anchor bolt.

Figure 2:
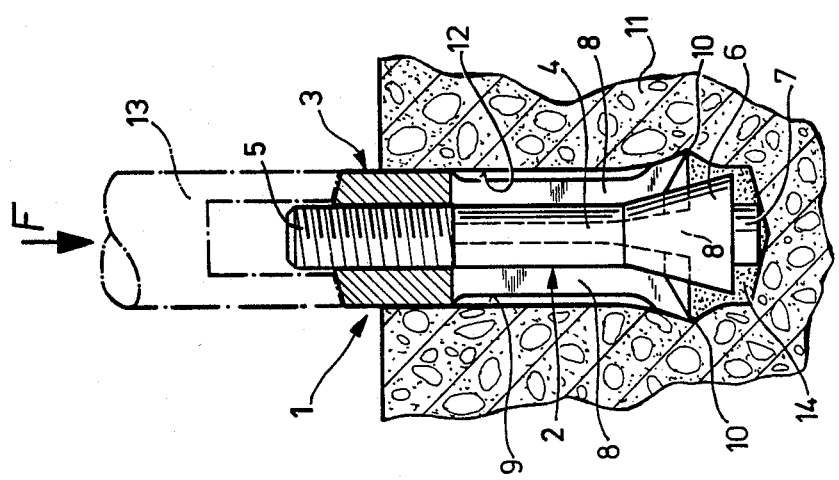
FIG. 2 is an elevational view, of the anchor bolt assembly shown in FIG. 1 during the insertion of the assembly into a borehole.

In FIG. 2 the insertion of the anchor bolt assembly embodying the present invention has commenced. A borehole 12 is formed in a receiving material 11 and has a diameter corresponding to the outside diameter of the expanding sleeve at its leading and trailing ends. Initially, the anchor bolt assembly 1 including the bolt 2 and the expanding sleeve 3, is inserted into the borehole 12 until the peg 7 at its leading end contacts the base of the borehole. Next, an insertion tool 13, shown only partially and in phantom, is placed against the trailing end of the sleeve and, by means of a hammer drill, not shown, the sleeve 3 is driven in the direction of the arrow F so that it is displaced axially relative to the anchor bolt 2 bearing against the base of the borehole 12. As the expanding sleeve 3 is driven forwardly its leading end portion rides over the trailing part of the frusto-conical section 6 and it is expanded radially outwardly. The expanding or spreading of the sleeve 3 removes material from the surface of the borehole 12. As is clearly shown in the drawing, there is a slight play or open space in the reduced diameter section 9 of the sleeve relative to its maximum outside diameter at the leading and trailing ends which corresponds to the diameter of the borehole. This play or tolerance is important for the unimpeded movement of the expanding sleeve as it is driven into the borehole. This play, important during the placement of the anchor bolt assembly within the borehole, is canceled out to a considerable extent when the anchor bolt 2 is stressed as shown in FIG. 3.

Figure 3:
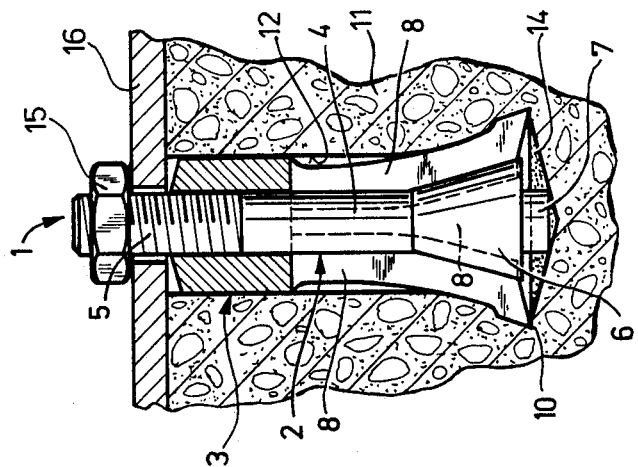
FIG. 3 is a view of the anchor bolt assembly illustrated in FIG. 1 fully secured within a borehole.

In FIG. 3 the sleeve has been fully driven into the borehole so that its leading end is located approximately at the leading end of the frusto-conical section 6 of the bolt. In this position, a bracket or plate 16 with an opening through it is placed on the trailing end part of the anchor bolt 2 and by turning a nut 15 around the thread 5 the plate 16 is fastened against the surface of the receiving material 11.

In FIG. 3 the anchor bolt assembly 1 is completely secured within the borehole 12 in receiving material 11 and the expanding sleeve 3 has effected a widening of the borehole by removing material from its surface. Due to the widening action of the sleeve 3, a form-locking engagement is afforded for the anchor bolt assembly 1 within the receiving material 11. Further, in FIGS. 2 and 3, a space 14 is shown in the base of the borehole 12 laterally surrounding the peg 7. Since the material displaced from the surface of the borehole is located within the space 14, the material cannot interfere with the spreading of the expanding sleeve 3 as it is driven into the borehole during the placement of the anchor bolt assembly 1. When the nut 15 is tightened onto the bolt after the expanding sleeve 3 is fully inserted, the frusto-conical section 6 is pulled in the direction out of the borehole into the sleeve causing further spreading and locking of the assembly within the borehole.

While specific embodiments of the invention have been shown and described in detail to illustrate the application of the inventive principles, it will be understood that the invention maybe embodied otherwise without departing from such principles.

We claim:

1. An anchor bolt assembly arranged to be inserted into and secured within a borehole comprising an axially extending bolt having a leading end inserted first into the borehole and a trailing end, said bolt having an axially extending frusto-conical section adjacent the leading end thereof with the axially extending surface of said frusto-conical section converging inwardly in the direction from the leading end toward the trailing end, said bolt including an axially extending cylindrically shaped shank rigidly secured to and extending from the smaller diameter end of said frusto-conical section toward the trailing end of said bolt so that said frusto-conical section and shank form a monolithic unitary member, means for securing a load to the trailing end of said bolt, an axially extending expanding sleeve laterally enclosing at least a major portion of an axially extending part of said bolt and said sleeve being axially displaceable relative to said bolt including said frusto-conical section on said bolt, said expanding sleeve having a leading end inserted first into the borehole and a trailing end so that said expanding sleeve can be driven into a borehole for displacement relative to said bolt and said frusto-conical section thereof for widening at least an axially extending section of said expanding sleeve extending from the leading end thereof, said expanding sleeve has axially extending slots therein extending from the leading end of said expanding sleeve toward the trailing end thereof with the trailing end of said slots spaced axially from the trailing end of said sleeve, said expanding sleeve has an inside diameter extending from the leading end thereof corresponding to the outside diameter of said cylindrically shaped shank and a maximum outside diameter axially and circumferentially extending first section greater than the largest diameter of said frusto-conical section and located at and extending axially from the leading end thereof, and the axially extending outside surface of said expanding sleeve extending from said first section has an axially and circumferentially extending second section located within the axially extending region of said slots and having a smaller diameter than the maximum outside diameter of said first section so that the outside surface of said expanding sleeve does not become jammed in the borehole when said expanding sleeve is driven into the borehole relative to said bolt and said frusto-conical section thereon, said smaller diameter axially extending second section having a leading end and a trailing end with the trailing end located approximately at the trailing end of said slots, the leading end of said smaller diameter second section of said sleeve is spaced axially from the leading end of said sleeve by a distance approximately equal to the wall thickness of said expanding sleeve at the leading end thereof, said leading end of said expanding sleeve having a continuous circumferentially extending radially outer edge and a continuous circumferentially extending radially inner edge and said outer and inner edges being interrupted circumferentially only by the leading ends of said slots and a leading end surface extending transversely of the axial direction of said expanding sleeve and extending radially inwardly from said radially outer edge of said radially inner edge located at said inside diameter to said expansion sleeve, said radially outer edge and radially inner edge each located in a separate plane extending perpendicularly of said sleeve axis, said leading end surface being recessed conically inwardly from said radially outer edge to said radially inner edge of said expanding sleeve so that the radially outer edge forms a sharp cutting edge and the leading end surface forms a conically shaped recess in the leading end of said sleeve located radially outwardly from said frusto-conical section on said bolt and extending axially inwardly from said cutting edge for receiving material cut from the borehole surface by said cutting edge as said expanding sleeve is driven into the borehole relative to said anchor bolt whereby with the leading end of said sleeve driven to the plane of the leading end of said frusto-conical section said recess remains radially outwardly from said frusto-conical section.

2. An anchor bolt assembly, as set forth in claim 1, wherein the depth of said smaller diameter second section of said sleeve radially inwardly from said first section is in the range of 0.01 to 0.02 times the maximum outside diameter of said first section of said expanding sleeve.

* * * * *